United States Patent
McGlone et al.

(10) Patent No.: US 10,806,121 B2
(45) Date of Patent: Oct. 20, 2020

(54) ANIMAL LITTER CONTAINING A PHEROMONE COMPOSITION

(71) Applicant: Sergeant's Pet Care Products, LLC, Omaha, NE (US)

(72) Inventors: John McGlone, Lubbock, TX (US); Mark Levin, Papillion, NE (US)

(73) Assignee: Sergeant's Pet Care Products, LLC, Omaha, NE (US)

( * ) Notice: Subject to any disclaimer, the term of this patent is extended or adjusted under 35 U.S.C. 154(b) by 366 days.

(21) Appl. No.: 15/707,604

(22) Filed: Sep. 18, 2017

(65) Prior Publication Data
US 2018/0000041 A1 Jan. 4, 2018

Related U.S. Application Data

(62) Division of application No. 14/517,102, filed on Oct. 17, 2014, now abandoned.

(51) Int. Cl.
*A01K 1/015* (2006.01)

(52) U.S. Cl.
CPC .......... *A01K 1/0152* (2013.01); *A01K 1/0154* (2013.01); *A01K 1/0155* (2013.01)

(58) Field of Classification Search
CPC ... A01K 1/0152; A01K 1/0154; A01K 1/0155
See application file for complete search history.

(56) References Cited

U.S. PATENT DOCUMENTS

| | | | | |
|---|---|---|---|---|
| 4,263,873 A | * | 4/1981 | Christianson | A01K 1/0155 119/172 |
| 5,415,131 A | * | 5/1995 | Dodman | A01K 1/0152 119/171 |
| 8,741,965 B2 | * | 6/2014 | Nouvel | A61K 31/11 514/703 |
| 2001/0052326 A1 | * | 12/2001 | Ellis | A01K 1/0155 119/171 |
| 2011/0150822 A1 | * | 6/2011 | Nouvel | A61K 9/007 424/84 |
| 2012/0318205 A1 | * | 12/2012 | Kuras | A01K 1/0155 119/173 |
| 2013/0071337 A1 | * | 3/2013 | McGlone | A61K 9/12 424/45 |
| 2013/0072570 A1 | * | 3/2013 | McGlone | A61K 9/12 514/703 |
| 2013/0210927 A1 | * | 8/2013 | Nouvel | A61K 31/11 514/703 |
| 2014/0000526 A1 | * | 1/2014 | Kuras | A01K 1/0154 119/173 |
| 2015/0366878 A1 | * | 12/2015 | Levin | A61K 9/008 424/45 |

* cited by examiner

*Primary Examiner* — Kristen C Hayes
(74) *Attorney, Agent, or Firm* — Armstrong Teasdale LLP

(57) ABSTRACT

An animal litter composition comprising 2-methylbut-2-enal is described for the modification and reduction of dominant behaviors in household animals.

23 Claims, 4 Drawing Sheets

ANIMAL LITTER CONTAINING A PHEROMONE COMPOSITION

FIELD OF THE INVENTION

The present disclosure is broadly concerned with the field of animal behavior and the use of pheromones. More particularly, the present disclosure is directed to the use of 2-methylbut-2-enal (a rabbit pheromone) in an animal litter, the 2-methylbut-2-enal being found to be useful in reducing litter dominance behaviors including aggression, soiling outside of a litter box, and anxiety, in household animals which are litter box trained, such as cats.

BACKGROUND OF THE INVENTION

One of the more commonplace items found in markets and homes today are animal litters which are sold for the purpose of receiving and absorbing (and/or adsorbing) urine and feces, liquid-containing animal waste, eliminated by household domestic animals; and particularly for small animals such as dogs, cats, mice, hamsters, and birds, that are typically kept in family homes or otherwise raised indoors in a household environment. Such litter materials are usually placed in containers termed "litter boxes"; and after a certain amount of time and usage by the animal has elapsed, the soiled litter material is disposed of and then replaced with clean litter material.

Cats are a non-packing, social species that form colonies based on the availability of resources such as food, resting sites, and litter boxes. In a household having multiple cats, the cats in a group quickly establish a social hierarchy by forming dominant and subordinate relationships, often through overt aggression. The dominant cat then maintains control of the resources (such as litter box, food and water) by marking with urine to indicate a territory, or lying down in the path to prevent other cats from accessing the resources. This behavior by the dominant animal often forces the subordinate animals to defecate or urinate outside of the litter box, or in alternative locations in the house in order to avoid negative interactions with the dominant cat. Moreover, when new cats are introduced into a household, the new animal must either accept a subordinate position in the hierarchy or force itself into the top position by fighting aggressively with the dominant animal and defending its territory. The presence of new cats causes stress and anxiety for both the dominant and the subordinate cats which triggers even more urine marking, elimination outside of the litter box, and other interactional aggressive behaviors in order to defend their social status.

Limited resources available in multi-cat households are often a cause of conflict or behavioral issues. (See Crowell-Davis et al. (2004) "Social organization in the cat: a modern understanding." Journal of Feline Medicine and Surgery 6:19-28). The presence of other cats in a household can cause stress and anxiety for both the dominant and the subordinate cats. Aggression and soiling outside the litter box are common issues encountered in multi-cat households, accounting for approximately 75% of cats being relinquished to animal shelters. Dominant behaviors are also often seen in other domestic or companion animals notwithstanding their packing nature, in some instance, associated with high level of certain hormone in certain period of time.

Methods currently used in the art to alleviate the litter box dominance issues due have been passive at best. The most common solution is to increase the number to litter boxes in the home and place multiple food stations at opposite ends of the house so that the dominant cat cannot control both paths at the same time. Some cat owners also put a bell on the collar of the dominant cat to allow the subordinate cat(s) to hear it coming and avoid it when necessary. When introducing new cats into the household, a slow integration over a long period of time is often tried to avoid disrupting the established social hierarchy so that litter box issues are not exacerbated. Additionally, off-label uses of anti-anxiety medicine, not approved for use in cats, have often been tried by cat owners to reduce the stress, anxiety or fear experienced by cats grouped in one household in order to stop urine marking, litter dominance and other negative behaviors derived from the "packing stress." However, the downside of using these off-label drugs includes carries potentially significant side effects, such as sedation, weight gain, urine retention, cardiac arrhythmias, and liver problems. As such, pet owners must obtain a veterinarian's supervision and subject their cats to blood tests at regular intervals in order to evaluate for side effects.

It will be readily appreciated therefore, that a litter formulation which includes a behavior modifying pheromone to positively reduce or eliminate dominant behavior or aggression among multiple household animals would be seen as a major advance and improvement in such preparations. In particular, there is a need in the art for use of an animal litter comprising 2-methylbut-2-enal to alleviate or eliminate dominant behaviors such as litter box dominance among multiple animals, such as cats, living in a single household, which litter composition calms the animals, reduces anxiety, stops urine marking, and prevents negative and aggressive inter-animal interactions.

SUMMARY OF THE INVENTION

An object of the present invention is to provide a novel animal litter composition useful in the reduction and/or modification of litter dominance behavior among household animals, wherein the animal litter composition comprises 2-methylbut-2-enal.

In a first embodiment, the animal litter composition comprises a polymeric material, the polymeric material comprising a pheromone composition, which composition comprises 2-methylbut-2-enal.

In a second embodiment, the animal litter composition comprises a pheromone composition, the pheromone composition comprising 2-methylbut-2-enal, a carrier solvent, and optionally other ingredients as necessary or desired, such as, for example, fragrances, coloring agents, preservatives, antioxidants, and the like.

Another object of the present invention is to provide a method for reducing dominant behavior in household animals for a period of time, the method comprising incorporating a pheromone composition comprising 2-methylbut-2-enal into an animal litter material to form an animal litter composition.

Another object of the present invention is to provide a method for modifying or reducing dominant behaviors in household animals for a period of time, the method comprising incorporating into litter material a pheromone composition comprising 2-methylbut-2-enal, the 2-methylbut-2-enal being present in the pheromone composition in an amount effective to modify the behavior of cats.

Another object of the present invention is to provide a method of using an animal litter composition to reduce dominant behaviors in household animals for a period of time, the method comprising: incorporating a pheromone composition comprising 2-methylbut-2-enal into an animal litter material to form an animal litter composition; and exposing the household animal to the animal litter composition, the amount of 2-methylbut-2-enal being present in the animal litter composition in an amount of from between about 0.00001% (w/w) to about 0.1% (w/w).

Another object of the present invention is to provide for a method of making an animal litter composition comprising 2-methylbut-2-enal, the method comprising incorporating a pheromone composition into animal litter material to form the animal litter composition, wherein the pheromone composition comprises from between about 0.0004% (w/w) to about 1% (w/w) 2-methylbut-2-enal, and the litter composition comprises from between about 0.00001% (w/w) to about 0.1% (w/w) 2-methylbut-2-enal.

In one embodiment, the method for making an animal litter composition comprises the steps of: preparing a polymeric formulation comprising an amount of 2-methylbut-2-enal, an amount of a polymer, and optionally an amount of additives; extruding the polymeric formulation into a shaped polymeric matrix; molding the polymeric matrix into molded particles; and mixing the molded particles into animal litter material, wherein the litter composition comprises from between about 0.01% (w/w) to about 15% (w/w) molded particles.

Alternatively, method for making an animal litter composition may comprise the steps of: preparing a polymeric formulation comprising an amount of 2-methylbut-2-enal, an amount of a polymer, and optionally an amount of additives; extruding the polymeric formulation into molded particles; and mixing the molded particles into animal litter material, wherein the molded particles comprises from between about 0.001% (w/w) to about 1% (w/w) 2-methylbut-2-enal, and wherein the litter composition comprises from between about 0.01% (w/w) to about 15% (w/w) molded particles.

In a second embodiment, the method for making an animal litter composition comprises the steps of: preparing a pheromone composition comprising an amount of 2-methylbut-2-enal, a carrier solvent, and optionally an amount of additives; and spraying the pheromone composition onto an animal litter material, wherein the animal litter composition comprises from between about 0.00001% (w/w) to about 0.1% (w/w) 2-methylbut-2-enal.

It is both unexpected and surprising that 2-methylbut-2-enal, a chemical which is known to be a pheromone in rabbits, can have a strong positive behavioral or physiological effect on members of other vertebrate species, such as cats, since pheromones are, by definition, functional only within the species from which they are emitted.

Various objects and advantages of this use will become apparent from the following description taken in conjunction with the accompanying drawings wherein are set forth, by way of illustration and example, certain embodiments of this invention.

DETAILED DESCRIPTION OF THE INVENTION

Figure 1:
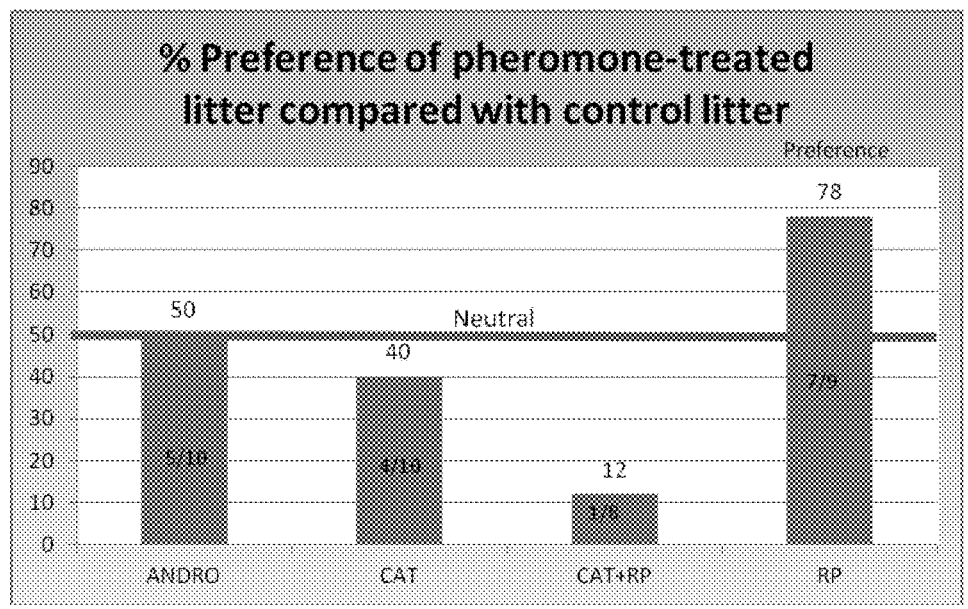
FIG. 1 is a graphic representation of litter preference by the cats, when the litter was treated with Androstenone (ANDRO), cat urinary pheromone (CAT, 3-mercapto-3-methyl-1-butanol), rabbit pheromone (RP, 2-methylbut-2-enal) and the combination of cat urinary pheromone and rabbit pheromone (CAT+RP).

The present invention relates to the use of 2-methylbut-2-enal to modify the behavior of different vertebrate species. Specifically, the present invention generally relates to the incorporation of 2-methylbut-2-enal into an animal litter for use by an animal species different from that which the pheromone is naturally emitted (e.g., not a rabbit) in order to modify the behavior of the animal.

An animal litter composition comprising 2-methylbut-2-enal may be used to reduce litter dominance and inter-cat aggression when multiple cats are living in a group within single household. When 2-methylbut-2-enal is incorporated into the animal litter, the animal exposed to the litter composition is calmed and less dominant and aggressive when present in a group. Following exposure to 2-methylbut-2-enal in litter, cats living in the same household were observed to have less litter dominance and urine marking problems, and the multiple cats were able to share the same litter box and other nearby resources without exhibiting, or having fewer, aggressive interactions towards each other.

It is both unexpected and surprising that 2-methylbut-2-enal, a rabbit pheromone, was observed to have such a large and meaningful effect on animals that are not rabbits, since pheromones are by definition species-specific. While pheromones are chemical substances used for communication between individual members of the same species, and which act as intraspecific chemical messengers perceived primarily by the olfactory sense and to a lesser extent, the gustatory sense of the animal, the present invention is utilizing 2-methylbut-2-enal as an Interomone®. As used herein, Interomone® means any naturally secreted or synthetically produced chemical released by one species, which, when administered to a member of a different vertebrate species, elicits a change in behavior or physiology of the different species with or without providing a benefit or harm to the species from which the chemical is released.

Androstenone (as disclosed in U.S. application Ser. No. 13/623,279 filed on Sep. 20, 2012) and 2-methylbut-2-enal are two examples that have been observed to work in a cross-species manner; however, the present invention has shown that 2-methylbut-2-enal, but not Androstenone, is effective in reducing dominant and aggressive behavior in cats. Other chemicals and their beneficial cross-species use that may become apparent to those skilled in the art following the teachings of the present invention are within the scope of this invention. Accordingly, the incorporation of 2-methylbut-2-enal to animal litter has been found to unexpectedly and surprisingly reduce behavior associated with litter box dominance, urine or stool marking, and negative/aggressive interactions among cats which exhibit stress, anxiety, and aggression when housed in a group contrary to their nature as a non-pack animal.

Incorporating 2-methylbut-2-enal into an animal litter can be typically accomplished through any method allowing for delivery of an effective amount of 2-methylbut-2-enal via inhalation by the animal, for example: by mixing or incorporating into the litter material a polymeric material that has been shaped into beads or pellets comprising a polymeric matrix, which matrix comprises 2-methylbut-2-enal; by spraying a pheromone solution comprising 2-methylbut-2-enal directly onto the surface of a litter material using an aerosol or pump spray; or by incorporating the pheromone solution into suitable litter material (i.e., clay, wood chips, plant stalk, sawdust, paper, grain, corncob, citrus peel, grass straw, polymer, silica gel, and combinations thereof) during the manufacture of the litter via impregnating, soaking or injection, or any other methods known in the art. Additionally, mixing a dry powder comprising 2-methylbut-2-enal into the litter, or placing the pheromone composition comprising 2-methylbut-2-enal next to, outside, near, or otherwise in general or close proximity to the litter box, would also be useful in delivering an effective amount of 2-methylbut-2-enal to an animal for use in controlling litter dominance and other types of animal behavior.

I. Pheromone Composition

The animal litter composition of the present invention comprises a pheromone composition, the pheromone composition comprising 2-methylbut-2-enal. The 2-metylbut-2-enal may be the natural pheromone secreted or isolated directly from a rabbit, or a synthesized compound characterized by the following structural formula (including enantiomers, diastereomers, or racemates thereof):

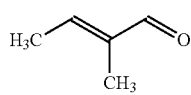

Formula I

The amount of 2-methylbut-2-enal present in the pheromone composition will be an amount effective to positively modify or alter the behavior (e.g., calm, reduce nervousness, or alleviate the dominance) of a particular animal when the pheromone composition is incorporated into an animal litter. Generally, the amount of 2-methylbut-2-enal present in the pheromone composition is at least 0.0004% (w/w). In one embodiment, the amount of 2-methylbut-2-enal present in the pheromone composition ranges from between about 0.0004% (w/w) to about 1% (w/w). For example, the pheromone composition used in the present invention may contain about 0.0004%, 0.0005%, 0.0006%, 0.0007%, 0.0008%, 0.0009%, 0.001%, 0.002%, 0.003%, 0.004%, 0.005%, 0.006%, 0.007%, 0.008%, 0.009%, 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, or 1% (w/w) 2-methylbut-2-enal. In another embodiment, the amount of 2-methylbut-2-enal present in the pheromone composition ranges from between about 0.0004% (w/w) to about 0.001% (w/w). Preferably, the amount of 2-methylbut-2-enal present in the pheromone composition ranges from between about 0.001% (w/w) to about 0.01% (w/w) and most preferably the amount of 2-methylbut-2-enal present in the pheromone composition is from between about 0.01% (w/w) to about 0.1% (w/w).

In addition to 2-methylbut-2-enal, the pheromone composition may further comprise a carrier solvent. In one embodiment, the pheromone composition includes at least one carrier solvent. Suitable carrier solvents are generally known within the art and are recognized to include lipophilic organic diluents, alcohols, ethylene glycol, propylene glycol, dipropylene glycol, ether, chloroform, benzene, carbon disulfide, oils including non-volatile and volatile liquids and oils, water, and combinations thereof. For example, 2-methylbut-2-enal can be dissolved in a suitable alcohol and supplied in a liquid form such as a pump spray or for use in animal litters. Suitable alcohols include ethanol, propanol, isopropanol, butanol, pentanol, hexanol, heptanol, octanol, and phenyl ethyl alcohol. In a preferred embodiment, the alcohols comprise ethanol, isopropanol, butanol, and phenyl ethyl alcohol. An alcohol solvent can be combined with water or a lipophilic organic diluent or carrier such as ethylene glycol, propylene glycol, dipropylene glycol, dipropylene glycol monoethyl ether, dipropylene glycol methyl ether, or Dow Corning® Q7-9180 silicone liquid. By way of example, the amount of solvent present in the pheromone composition may range from between about 0.5% (w/w) to about 99.99% (w/w) of the pheromone composition. For example, the pheromone composition may contain about 0.5%, 1%, 1.5%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99%, 99.5%, and 99.99% (w/w) of a solvent.

In one embodiment, the solvent comprises water and an alcohol selected from the group consisting of ethanol or isopropanol. Preferably, the water is present in the pheromone composition in an amount of from between about 70% (w/w) to about 99.99% (w/w) of the pheromone composition, most preferably in an amount of from between about 80% (w/w) to about 98.5% (w/w). Additionally, the alcohol is present in the pheromone composition in an amount of from between about 1% (w/w) to about 20% (w/w), most preferably from between about 1.5% (w/w) to about 10% (w/w).

The pheromone composition may optionally contain additional components such as odor removers and fragrances (i.e., "additional components"). The pheromone composition may include one additional component or a combination of any of the forgoing additional components in varying amounts. Suitable examples of each type of additional component are detailed below.

A suitable odor remover may be an amphoteric compound which may be a linear long chain aliphatic acid with alkyl side chains or long chain fatty acids. Examples of such compounds include alkylbetaines, amidopropyl betaines, amidopropyl sultaines, and combinations thereof. Generally, odor remover may comprise between about 0.25% (w/w) to about 1% (w/w) of the pheromone composition.

The pheromone composition may optionally comprise a fragrance. The fragrance may be any fragrance that provides a desired odor masking effect since the pheromone or pheromones used in the pheromone composition may have a pungent odor. Although a variety of fragrances may be employed without departing from the scope of the present invention, suitable fragrances include floral essences, citrus blossoms, oil or extracts of conifers, or spices. Examples of floral essences include rose, lilac, lavender, gardenia, and jasmine. Suitable citrus blossoms include orange and lemon, and suitable oil or extracts of conifers include pine and juniper. Generally, fragrance may comprise between about 0.25% (w/w) to about 1% (w/w) of the pheromone composition.

The pheromone composition may also comprise pheromones other than 2-methylbut-2-enal.

In one embodiment, the pheromone composition comprises from between about 0.0004% (w/w) to about 1% (w/w) 2-methylbut-2-enal, about 10% (w/w) isopropyl alcohol and about 89% (w/w) water. Additionally, between about 0.5% (w/w) to about 1% (w/w) of a fragrance may be added to the pheromone composition.

The pheromone composition may be incorporated into a polymeric matrix, which is then processed into molded particles comprising the pheromone composition using standard methods known in the art, the molded particles being formed, for example, into pellets, spheres, microspheres, beads, microbeads, bubbles, microbubbles, flakes, granules, or other molded particle. The molded particles may be uniform in size/dimension or, alternatively, may be varying in size/dimension. The molded particles comprising the pheromone composition are suitable for incorporation into an animal litter to form an animal litter composition comprising a pheromone composition. In a preferred embodiment, the molded particles are bead shaped. The molded particles comprise a pheromone composition which composition comprises from between about 0.001% (w/w) to about 1% (w/w) 2-methylbut-2-enal, preferably between about 0.01% (w/w) to 0.05% (w/w) 2-methylbut-2-enal, and most preferably between about 0.01% (w/w) to about 0.03% (w/w) 2-methylbut-2-enal.

Generally, the animal litter composition comprises molded particles in an amount of from between about 0.01% (w/w) to about 15% (w/w) molded particles. In one embodiment, the animal litter composition comprises about 2% (w/w) molded particles. In another embodiment, the animal litter composition comprises about 3% (w/w) molded particles.

Any polymer and process for forming a shaped polymeric matrix having an active ingredient incorporated therein and suitable for being mixed with animal litter, as is well known and amply described in the art, may be used with the pheromone composition of the present invention. See, for example, U.S. Pat. Nos. 3,852,416, 3,318,769, 4,150,109, and 5,437,869. Generally, a polymeric material and the active component(s) are blended together to form a polymeric formulation, which polymeric formulation is then formed into desired shapes through an extrusion or molding process to form a polymeric matrix.

The polymeric material is preferably a polymer or co-polymer having suitable release characteristics such that the pheromone composition can be slowly released from the matrix over an extended period of time for inhalation by the target animal. Suitable polymers and co-polymers for making a matrix carrying an active ingredient are well known in the art and include, but are not limited to, polyethylene, polyvinyl acetate, ethylene acid copolymers, ethylene acrylates, polyurethanes, styrene-butadiene, polyvinyl butyral, polyvinyl chloride (PVC), polyolefin, polyacrylate, polymethacrylate esters, silicon polymer, and combinations thereof. The polymers contribute between about 50% (w/w) to about 99.99% (w/w) of the matrix carrying the pheromone composition, and typically will contribute between about 80% (w/w) to about 99.99% (w/w) of the matrix.

In addition to the polymeric material and pheromone composition of the present invention, a variety of other components may be added to the polymeric formulation at any step in the matrix formation process without departing from the scope of the invention. For example, plasticizers, stabilizers, fragrances, deodorants, coloring agents, synergists, lubricants, fillers, preservatives, antioxidants, light stabilizers, pesticides, and combinations thereof may be included in the polymeric formulation for the matrix.

Plasticizers can be incorporated into the polymeric formulation to make the polymer more flexible. Suitable plasticizers may include adipates, phthalates, phosphates, and citrates. One or more plasticizers may be added to the polymeric material and may include, but are not limited to, diethyl phthalate, diisodecyl phthalate (DIDP), diethyl hexyl phthalate, di-n-butyl phthalate, benzyl butyl phthalate, acetyl tributyl phthalate, dioctyl sebacate, dioctyl adipate, acetyl tributyl citrate, tricresyl phosphate, 2-ethylhexyl diphenyl phosphate, and combinations thereof.

Any stabilizer known in the art can also be incorporated into the polymeric formulation, such as for example, glycerol monostearate (GMS) or cetostearyl alcohol.

In one embodiment, the molded particles carrying the pheromone composition are prepared by first combining the polymer or copolymer and any other dry additives (e.g., coloring agents, plasticizers, etc.) together and mixing the dry ingredients until a uniform dry blend is achieved. Next, the pheromone composition comprising 2-methylbut-2-enal and optionally, any liquid additives (e.g., other pheromones, carriers, lubricants, preservatives, etc.) are mixed together until a homogenous liquid blend is formed. The liquid blend is then combined with the dry blend, along with any fragrances, if desired. The mixture is then blended for a period of time, for example between about 1 hour and about 3 hours to form a polymeric formulation. The polymeric formulation is then processed into a molded particle, such as beads, pellets, spheres, flakes, granules, or the like on a conventional extruder or molding machine at low temperatures (that is, at a temperature that will melt the polymer or copolymer, which is generally between about 230° F. and about 250° F.) using methods known in the art. Alternatively, the polymeric formulation can be processed into a shaped matrix or article, such as a strip, using extrusion, which shaped matrix can then be further processed into molded particles.

Generally, the size of molded particles depends on the density and size of the animal litter particles, compatibility of the molded particles with litter material, and the need to eliminate segregations between the molded particles and the litter. In one embodiment, the molded particles are between about 0.02" and about 0.1" in diameter or length (depending on the shape of the molded particles). In one embodiment, the molded particles are about 0.06" in diameter or length. In alternative embodiments, any known process for preparing the molded particles carrying one or more active ingredients may be employed and the components for preparing the molded particles may be combined in any order or at any step without departing from the scope of the invention.

The molded particles comprising the pheromone composition are then mixed or incorporated into the litter material of an animal to be treated. The polymeric matrix present within the molded particles enables the 2-methylbut-2-enal to be released to the surface of the particles continuously over a period of at least a second, 1 minute, 10 minutes, 30 minutes, 1 hour, 5 hours, 10 hours, 24 hours, two days, three days, six days, one week, two weeks, three weeks, four weeks, or at least 30 days, so that the animal continues to inhale the pheromone for an extended period of time while the litter composition comprises the molded particles.

II. Methods of Using the Compositions to Modify Animal Behavior

The present invention is further directed to a method of using 2-methylbut-2-enal in animal litter to modify undesirable dominant and aggressive behaviors or physiology in non-pack animals living in a group within a single household. The methods of the present invention comprise exposing an animal to an animal litter composition, wherein the litter composition comprises a litter material and an effective amount of a pheromone composition comprising at least about 0.0004% (w/w) 2-methylbut-2-enal, generally between about 0.0004% (w/w) to about 1% (w/w) 2-methylbut-2-enal.

Animals that are stressed by exposure to other animals in an enclosed space will typically exhibit highly undesirable stress-related behavioral symptoms. Such undesirable behaviors are commonly recognized and include, for example, litter dominance, and other resultant or related behaviors such as excessive pacing, or excessive laying down; hyperactivity such as jumping; aggressive behavior toward people or other animals such as growling, snappishness or biting; property destruction; frequent urination or soiling; and fearful behavior such as cowering or shaking. The efficacy of the pheromone composition in reducing litter dominance and other related behaviors can be tested, for example, by spraying the animal litter with the pheromone composition, or using litter material impregnated with the pheromone composition, or mixing into the litter material molded particles comprising the pheromone composition. In any case, the pheromone composition is sufficiently volatile for the animal to inhale and thus be exposed to a sufficient amount of the pheromone to produce a noticeable behavioral effect. For example, a reduction in undesirable outward behaviors is readily ascertainable (e.g. noticeable reduction in aggressive displays, urine marking and/or accessibility of a single litter to any or all of the grouped animals), and can be supplemented by observing other physical indicators of stress such as heart rate, weight changes, and secretion of stress hormones such as cortisol.

The pheromone composition according to this invention may be applied to litter material in a variety of ways to enable the animal to inhale the pheromone composition, as the nasal cavities, sinuses, lungs and throats of animals present a large area for the aromatic molecules to be bound to an olfactory receptor. For example, the pheromone composition can be sprayed directly onto existing litter material or clean litter material upon each litter change, such that it may be inhaled by the animal regularly and constantly to obtain the desired behavioral modification. Alternatively, the pheromone composition comprising 2-methylbut-2-enal in liquid, gas, or solid form can be incorporated in a plasticized material such as silica gel or the like that can then be formed into litter material that is ready to be used to control dominant behavior.

The pheromone composition comprising 2-methylbut-2-enal can also be pre-mixed with a binder known and used in the art to absorb liquids and activate clumping of the litter particles upon contact with liquid waste. The binder may be any binder used in the art with animal litters, for example, those described in U.S. Pat. Nos. 5,183,010 and 5,359,961, as well as including, but not limited to, maltodextrins, modified food starch, calcium carbonate, sodium bicarbonate, corn syrup, and solubilized protein, and the like.

Other suitable carriers of the pheromone composition comprising 2-methylbut-2-enal for animal litter include, but are not limited to, suitable litter material such as clay, wood chips, plant stalk, sawdust, paper, grain, corncob, citrus peel, grass straw, polymer, silica gel, and combinations thereof. To carry 2-methylbut-2-enal, these litter materials can be processed during the manufacture of the litter via impregnating, soaking, injection, spraying, or any other method known in the art.

In addition, molded particles comprising the pheromone composition can be mixed with litter material as needed or periodically in order to continually release the pheromone over a period of time. In addition, the pheromone composition in a form of dry powder (either blended or pure) can be added to and mixed with litter. Moreover, the pheromone composition comprising 2-methylbut-2-enal can be placed next to a litter box or in the general proximity of the litter by attaching external attachments or accessories to the animal litter box for dispensing, distributing, discharging, releasing or emitting 2-methylbut-2-enal into the air space surrounding the animal litter. The administration of the pheromone composition to animals in a group can be accomplished by applying the pheromone composition to the litter as often as needed to modify the animal's dominant behavior. Passive solutions including preparing more than one animal litter box in a single household for multiple animals would not be necessary.

The animal can be exposed to the 2-methylbut-2-enal through the release of the pheromone composition from the litter material, which enables the animal to inhale the pheromone over a period of time sufficient to effect a modification of the dominant behavior previously observed. Typically, depending on the chosen route of application to the litter (e.g., spraying the litter with the pheromone composition, incorporating molded particles comprising the pheromone composition into the litter material, etc.), the particular animal using the litter composition, the number of the animals in the household, or other situations, the exposure of the pheromone composition to the animal will be over a period of at least one second, but can also be for a period of at least one hour, for a period of between one hour and five hours, for a period of between six hours and ten hours, for a period of at least one day, for a period of at least one week, for a period of between one week and four weeks, for a period of at least one month, or for any period of time as may be needed to achieve a satisfactory behavioral effect. For example, an animal suffering from dominance induced anxiety, may require a regular and extended exposure to the animal litter composition to relieve the anxiety and associated behavior. The pheromone composition may be sprayed on the animal litter or the molded particles comprising the pheromone composition may be mixed into the animal litter at least once a day, or once every other day, or once every three days, or any other frequency that may be effective in modifying the animal's behavior. Additionally, when a new animal is added into the group, it may be beneficial to increase the amount of pheromone composition in the litter for at least the initial introductory period.

It should be understood that the 2-methylbut-2-enal used in the pheromone composition may be provided in the form of pure concentrate (100% concentration) or a diluted composition with additional excipients in the dosage form (i.e. the amount of active ingredient in the composition is less than or equal to 99.99%, and the remainder consists of inactive excipients). If diluted, the amount of 2-methylbut-2-enal dispensed in the various dosage forms may range from between about 1.0 pg/mL to about 1.0 g/mL, more preferably between about 1.0 ng/mL to about 1.0 g/mL. One of skill in the art will appreciate that the volume of active component added to the pheromone composition will need to be adjusted to account for the dilution and to ensure the end composition comprises the appropriate final concentration of 2-methylbut-2-enal. One of skill in the art will also appreciate that the various components of the composition may be provided in a variety of dosage forms including, but not limited to liquid solution or suspension, emulsion, aerosol, slow release matrices, and the like.

Unless otherwise defined, all technical and scientific terms used herein have the same meaning as is commonly understood by one of skill in the art to which this invention belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

As used herein, "a" and "an" mean one or more, unless otherwise indicated.

As used herein, "Interomone®" means any naturally secreted or synthetically produced chemical released by one species, which, when administered to a member of a different vertebrate species, elicits a change in behavior or physiology of the different species with or without providing a benefit or harm to the species from which the chemical is released.

The term "incorporating" means contacting the solid litter material with 2-methylbut-2-enal, and thus encompasses surface spraying with a pheromone solution comprising 2-methylbut-2-enal, absorbing by impregnating or soaking the litter material with a pheromone solution comprising 2-methylbut-2-enal, and admixing by direct placement of polymeric beads, particles or pellets comprising a polymeric matrix, which matrix comprises 2-methylbut-2-enal into the litter, such that the 2-methylbut-2-enal can be released from the beads, particles, or pellets and inhaled by the animal over a period of time, ranging from hours or days to weeks.

The term "effective amount" means an amount of 2-methylbut-2-enal present in an animal litter that is sufficient to produce a noticeable modification, i.e. improvement of behavior in the subject animal, as determined according to behavioral observations as described herein. The effective amount will depend on factors such as the weight and the material of the litter; the severity of the behavior being treated; individual animal parameters including age, physical condition, size and weight; the number of the animals in a group; concurrent treatments; the frequency of treatment; or the method of incorporation of the pheromone composition to the animal litter. These factors are well known to those of ordinary skill in the art and can be addressed with no more than routine experimentation.

As used herein, "vertebrate" or "vertebrate species" is interchangeable with the word "animal" or "animal species" and encompasses any group of animals distinguished by possession of a vertebral column. Examples of vertebrate species include, but are not limited to, domestic animals such as cats and dogs; small animals, such as hamsters, rabbits, ferrets, rats, mice, and guinea pigs; commercial animals, such as horses, sheep, cattle, and swine; animals in captivity, such as apes, chimpanzees, tigers, lions, bears, elephants, zebras; amphibians such as frogs and salamanders; reptiles such as snakes, turtles, crocodiles, alligators, and lizards; birds, and the like.

As used herein, "sphere" means a particle that is substantially, although perhaps not exactly, spherical and further refers to both beads and bubbles.

As used herein, "bead" means a solid particle that is substantially, although perhaps not exactly, spherical.

As used herein, "bubble" means a hollow particle that is substantially, although perhaps not exactly, spherical.

As used herein, "microsphere" means spheres having a diameter less than about 1 millimeter.

As used herein, "microbead" means beads having a diameter less than about 1 millimeter.

As used herein, "microbubble" refers to bubbles having a diameter less than about 1 millimeter.

As used herein "molded particle" means a particle that has a predetermined shape as a result of having been formed in a mold cavity or extruder.

As used herein "household animals" means animals kept as pets or companion animals within a home and which may be litter box trained. Examples of household animals include, but are not limited to, cats, dogs, rabbits, ferrets, gerbils, hamsters, chinchillas, guinea pigs, and domesticated rats.

Although the invention described herein is susceptible to various modifications and alternative iterations, specific embodiments thereof have been described in greater detail above. It should be understood, however, that the detailed description of the use of Androstenone is not intended to limit the invention to the specific embodiments disclosed. Rather, it should be understood that the invention is intended to cover all modifications, equivalents, and alternatives falling within the spirit and scope of the invention as defined by the claim language.

EXAMPLES

Example 1—Preparation of Pheromone Composition Comprising 2-methylbut-2-enal

A pheromone composition comprising 2-methylbut-2-enal was prepared in accordance with the formulation set forth in Table 1. The pheromone composition was prepared as a liquid spray formulation and applied directly onto litter material, whereby the animal litter composition comprised from between about 0.0001% (w/w) to about 0.01% (w/w) 2-methylbut-2-enal. Alternatively, the pheromone composition prepared as set forth in Table I was incorporated into a polymeric matrix as detailed in Example 4, below.

TABLE 1

Pheromone Composition Comprising 2-methylbut-2-enal

| Ingredient | % | grams |
| --- | --- | --- |
| 2-methylbut-2-enal | 0.01 | 0.01 |
| Isopropyl Alcohol | 10.00 | 10.00 |
| Lavender Chamomile fragrance #AA101592 | 0.50 | 0.5 |
| D.I. water | 89.49 | 89.49 |
| Total | 100.00% | 100 |

Example 2—Incorporation of 2-methylbut-2-enal into a Binder for Application to Animal Litter A pheromone composition comprising 2-methylbut-2-enal in liquid form or dry powder form can be prepared in accordance with the formulation set forth in Table 2. The pheromone composition can be pre-mixed with a binder, such as calcium carbonate or sodium bicarbonate, and applied to the litter material, whereby the animal litter composition would comprise between about 0.0001% and about 0.01% (w/w) 2-methylbut-2-enal.

TABLE 2

Pheromone Composition Comprising 2-methylbut-2-enal

| Ingredient | % | grams |
|---|---|---|
| 2-methylbut-2-enal (liquid or dry powder) | Up to 1% | Up to 1 gram |
| Binder | About 99% | About 99 grams |
| Total | 100.00% | 100 |

Example 3—Incorporating 2-methylbut-2-enal in Dry Powder Form (Blended or Pure) into Animal Litter 2-methylbut-2-enal in dry powder form can be applied to an animal litter by spraying the 2-methylbut-2-enal powder directly onto the animal litter, whereby the animal litter composition would comprise between about 0.0001% and about 0.01% (w/w) 2-methylbut-2-enal in powder form.

Example 4—Preparation of Polymeric Matrix Comprising 2-methylbut-2-enal

A polymeric matrix comprising 2-methylbut-2-enal can be prepared according to typical industry techniques as described hereinabove. Table 3 is the list of ingredients that can be used to prepare the polymeric matrix.

TABLE 3

Polymeric Matrix Comprising 2-methylbut-2-enal

| Ingredient | % | grams |
|---|---|---|
| 2-methylbut-2-enal | 0.02 | 0.02 |
| MU-760000 (Microthene) | 99.780 | 99.780 |
| Corona magenta - Pink (DayGlo) | 0.100 | 0.100 |
| Blue #2 (DayGlo) | 0.100 | 0.100 |
| Total | 100.00% | 100 |

Example 5—Preparation of Polymeric Matrix Containing 2-methylbut-2-enal and an Additional Pheromone for Use by Mixing with Cat Litter A polymeric matrix comprising 2-methylbut-2-enal and an additional pheromone composition can be prepared according to typical industry techniques as described hereinabove. Table 4 is the list of ingredients that can be used to prepare a polymeric matrix comprising 2-methylbut-2-enal and an exemplary additional pheromone composition.

TABLE 4

Polymeric Matrix Comprising 2-methylbut-2-enal and an Additional Pheromone

| Ingredient | % | grams |
|---|---|---|
| 2-methylbut-2-enal | 0.02 | 0.02 |
| MU-760000 (Microthene) | 93.88 | 93.88 |
| Pheromone H (ModernVeterinary Therapeutics, Florida) | 6.00 | 6.00 |
| Blue #2 (DayGlo) | 0.100 | 0.100 |
| Total | 100.00% | 100 |

Example 6—Preparation of an Animal Litter Composition Comprising a Pheromone Composition for Use with Cats An animal litter composition comprising a pheromone composition can be prepared by first forming molded particles from a shaped polymeric matrix prepared in accordance with Example 4 or 5, wherein the molded particles comprise a pheromone composition comprising 2-methylbut-2-enal. The molded particles can then be combined with, mixed into, or otherwise incorporated into litter material upon use of the litter. An animal litter composition of about 2 lbs. to about 6 lbs. will comprise between about 0.01% and about 15% (w/w) molded particles (the molded particles comprising about 0.02% (w/w) 2-methylbut-2-enal) in order to be effective in alleviating litter dominant behavior and associated aggression and anxiety in cats exposed to the pheromone composition as released from the litter. For example, an animal litter comprising about 2% to about 3% molded particles will result in the litter comprising between about 0.0004% (w/w) and about 0.0006% (w/w) 2-methylbut-2-enal. Accordingly, it will be observed that an animal litter composition comprising about 0.0004% to about 0.0006% (w/w) 2-methylbut-2-enal will elicit a positive behavior modification in cats, which behavior modification can last at least 24 hours, and is most evident in the first 6-8 hours following exposure of the animal to the animal litter composition.

Example 7—Determining the Efficacy of an Animal Litter Composition Comprising 2-methylbut-2-enal When Molded Particles Comprising 2-methylbut-2-enal Are Incorporated in Regular Cat Litter for Use with Cats Three distinct studies were conducted for the purposes of examining and determining the efficacy of an animal litter composition comprising 2-methylbut-2-enal when molded particles comprising 2-methylbut-2-enal are incorporated into regular cat litter.

A total of 104 cats were used in the three studies. The cats used were of mixed genetics and obtained from various breeding facilities. Assessment was made to these cats as to general health and behavior. These cats were a mix of intact males, intact females and castrated males between 1 and 10 years of age. Body weight of each cat was taken at the beginning and end of each study.

During the studies, cat behavior was captured on video for the duration of the 24- or 48-hour period depending on the specific study. Red lights were used at night to allow for continuous observation. A scan sampling method was used to record cat behaviors each 5 minutes. The recorded videos were subsequently reviewed and analyzed in each 5-minute scan sample, with tape playing 30 frames per second. At each 5-minute time point, each cat was categorized as anxious or relaxed. Aggression or litter box usage occurred between 5-minute periods were also noted. A list of observed cat behavior and their definitions are provided in Table 5.

TABLE 5

Definitions of Behaviors Used in This Study

| Behavior | Definition |
|---|---|
| Head in food/water dish | Cat is actively eating or drinking; or, cat is showing significant interest in food or water. |
| Sitting or Lying - not touching | Cat is sitting or lying with no body part in direct contact of other individual. |
| Sitting or Lying - touching | Cat is sitting or lying with some part of body in direct contact of other individual. |
| Aggression | Cat is actively engaged in fighting, hissing, or dominance behavior. |
| In litter box - not using | Cat is sitting, standing, or lying inside litter box, but is not actively using it. |
| Using litter box | Cat is urinating or defecating inside litter box. |
| Grooming self | Cat is grooming own body. |
| Grooming other | Cat is grooming body of other individual. |
| Sleeping | Cat is lying in a relaxed state with eyes closed. |
| Neutral social interaction | Cat is engaged in non-aggressive interaction with other individual, such as nose-touching or rubbing[1]. |
| Locomotion | Cat is walking, pacing, running, or climbing. |
| Play | Cat is engaged in activity for sake of amusement; either alone or with other individual. |
| Anxiety | Cat is displaying behaviors typically associated with stress, such as hiding, pacing, aggression, vocalization, and obvious tension. |

[1]Definition from Crowell-Davis et al., 2003.

Because each scan sample is of 5-minute period, a total of 24 observations for each individual behavior are possible for each 2 hours. The instances of an individual behavior ($A_n$; n=1, 2, 3, ... 24) in each 5-minute period were totaled for instances in each 2 hours ($B_m = \Sigma A_n$, n=1, 2, 3, ... 24; m=1, 2, 3, ... 12) over 24 hours. The behavioral score for each 2-hour period is $\Sigma A_n/24$ (n=1, 2, 3, ..., 24). A behavioral score for a 24-hour period is $\Sigma B_m/12$ (m=1, 2, 3, ... 12). Among all behavior assessed, aggression, in-litter-box and anxiety were scored as yes or no during each 5 minutes ($A_n$=1 or 0; n=1, 2, 3, ... 24). In addition, anxiety was measured as a percentage of the total time that the cat was experiencing anxiety. As such the anxiety related behavioral score for a 24-hour period is $0.347 \times \Sigma B_m$ (%) ($B_m = \Sigma A_n$(%), n=1, 2, 3, ... 24; m=1, 2, 3, ... 12), which reflects the percentage of time over 24 hours that the cats are experiencing anxiety. Moreover, when ranking cat pairs based on their level of aggression, the sum of the aggression scores of the individual cats in the pair was used to rank the cat pairs.

Behavior data (behavioral scores) were further analyzed by Least Squares Analysis of variance using SAS (2011, SAS Inst., Inc., Cary, N.C.) software and the p-diff general linear model procedures to assess treatment differences within each time period. This statistical model included effects of treatment (TRT), cat-pair within treatment (TRT*CAT), time (HR), treatment by time (TRT*HR) and residual error (SE; used to test remaining effects).

Studies and Results

Study 1

In Study 1, four different treatments were tested: Androstenone (ANDRO); cat urinary pheromone, 3-mercapto-3-methyl-1-butanol (CAT); rabbit pheromone, 2-methylbut-2-enal (RP); and both the cat urinary pheromone and the rabbit pheromone (CAT+RP). 40 individual cats were used in this study to assess their preference to or aversion from a control litter versus a litter under one of the four treatments. Each treatment was tested with 10 cats. Litter was divided into 3 lb aliquots, and each aliquot was either used as a control or was mixed with a pheromone (or a pheromone combination) to be tested at a level of 10 µg/3-lb (or 7.3 µg/kg).

On Day 0, each cat was placed into an assigned chamber randomly placed with two litter boxes, one control and one treated. Each of the two litter boxes was weighed and the weight was recorded. The camera in the chamber was properly aligned to give a full view of the chamber and started taping on Day 0. On Day 1, 24 hours after the start of taping on Day 0, each of the two litter boxes in the chamber was weighed and the weight was recorded. On Day 2, 48 hours after the start of taping on Day 0, each of the two litter boxes in the chamber was again weighed. Litter can be disposed of after weighing on Day 2, and the camera was then turned off. The weights of the litter boxes over the 48 hours were used to determine whether the litter was used or not, and at which preference level.

The data were expressed as both a percentage preference (% of the cats using the treated litter in each treatment group) and by the weight of the litter (the litter gets heavier as it is soiled). It was expected that if the added pheromone had no effect on litter preference, 50% of the cats would use the treated litter and 50% would use the control litter. As such, a litter use less than 50% would be an aversion and a use significantly higher than 50% would indicate a preference for the litter. Further, the weight difference between a control litter or litter under treatment was used to show the relative strength of the effect of a particular treatment on cat's litter use behavior. During the study, some cats (N=3; 2 in CAT+RP and 1 in RP) spilled their litter and their data were unreliable and were not included.

Results as to Cat Litter Preference:

First treatment (ANDRO): 5 out of the 10 cats used the Androstenone treated litter (50%), while the other 5 used the control litter (FIG. 1). Therefore, because 50% of the cats used the litter treated with Androstenone, the Androstenone treated litter did not provide any attraction to cats to use the treated litter. Further, 11% less litter weight was observed in litter treated with Androstenone than the control litter (Table 5).

Second treatment (CAT): 4 out of the 10 cats used the litter treated with cat urinary pheromone (40%), while 6 cats preferred the control litter (FIG. 1). Therefore, CAT litter use was less preferred (40%) than control litter. That is, the cat urinary pheromone in the litter caused a slight aversion to the cats. Further, 43% less weight was observed in the litter containing CAT than control litter (Table 5), which reduction was significant.

Third treatment (CAT+RP): only 1 out of 8 cats (2 cats spilled the litter and were excluded from data) used the litter treated with the combination of cat urinary pheromone and rabbit pheromone (12%), while 8 of the 9 cats preferred the control litter (FIG. 1). Therefore, (CAT+RP) litter use was significantly lower than the control litter. That is, the CAT+RP combination caused significant aversion to the cats. Further, the CAT+RP litter box weighed 65% less than the control litter box (Table 5), a reduction more than the treatment with CAT alone.

Fourth treatment (RP): the litter treated with rabbit pheromone was highly preferred over the control litter. Specifically, 7 out of 9 cats chose to use the litter treated with rabbit pheromone (78%), as opposed to the control litter (FIG. 1). As such, the rabbit pheromone increased the litter attraction by more than 3.5 times. Further, the litter treated with rabbit pheromone was 138% heavier than control litter (Table 6), indicating a significant increase in litter use.

TABLE 6

Weights of litter after 2 days with litter containing either the vehicle or a pheromone/Interomone ®

| Litter Type Use, g | | | Significantly |
|---|---|---|---|
| CON | TRT | Relative Difference, % | Different |
| 0.645 | 0.571 ANDRO | −11% | No |
| 0.982 | 0.562 CAT | −43% | Yes |
| 0.676 | 0.234 XCAT + RP | −65% | Yes |
| 0.319 | 0.76 RP | 138% | Yes |

SE = 0.023.

The above results illustrated that Androstenone (also an Interomone® and found to have an effect similar to 2-methylbut-2-enal in reducing dog anxiety), did not have an effect on reducing litter dominance related behavior in cats unlike 2-methylbut-2-enal. Also, 3-mercapto-3-methyl-1-butanol (CAT) averted cats from the treated litter more than Androstenone with a percentage of preference of 40% and a 43% weight reduction in use treated litter. The litter treated with 3-mercapto-3-methyl-1-butanol and 2-methylbut-2-enal combination (CAT+RP) significantly averted cat from litter using (P<0.001 by Chi-Square), with a 12% preference percentage and a 65% litter weight reduction in comparison to the control. Whereas litter treated with 2-methylbut-2-enal (RP) alone significantly attracted cats to the litter (P<0.001 by Chi-Square), with a 78% preference percentage and 138% litter weight increase in comparison to the control. Therefore, study 1 established that (1) 2-methylbut-2-enal had significant effect on cats' litter preference and use, and that cats preferred litter treated with 2-methylbut-2-enal, (2) cats had an aversion to 3-mercapto-3-methyl-1-butanol (CAT) and 2-methylbut-2-enal combined with 3-mercapto-3-methyl-1-butanol (CAT+RP), and (3) cats were not affected by Androstenone (ANDRO) in the litter.

Study 2

The previous study established that cats are attracted to litter treated with 2-methylbut-2-enal. In this study, 48 cats were used to determine the effect of litter treated with 2-methylbut-2-enal (RP) to the cat's various behaviors listed in Table 5.

Litter was prepared in two batches, by mixing beads about 0.065" in length both with and without 2-methylbut-2-enal. Blank beads were mixed thoroughly into one batch of litter so that the litter comprised about 3% (w/w) beads to form the control litter (CON). Similarly, beads containing a pheromone composition comprising 0.02% (w/w) 2-methylbut-2-enal (formed in accordance with Example 2 or 3) were mixed thoroughly into the other batch of litter so that the litter also comprised 3% (w/w) beads to form the treated litter (RP). Each batch of the litter was divided into 3 lb. aliquots that were ready to be tested.

The 48 cats were randomly grouped into 24 same-sex pairs, which were divided into two groups with 12 pairs in each. The cats of each pair had either been housed individually or in groups of two previously, but had not been placed together prior to this study. As such, each cat was made sure to pair with an unfamiliar cat for the duration of the study. The first 12 pairs of two unfamiliar cats were tested over a 48-hour period. Subsequently, all chambers used were sanitized and aired out, and then the second group of 12 pair of cats was tested.

Each pair of cats was placed in a kennel containing one food dish, one water dish, and one litter box. Litter boxes were managed on the following schedule, so that behavioral data relating to control litter was collected on Day 1, and that behavioral data relating to RP litter was collected on Day 2:

(1) 0 hour—Add 3 lb. aliquot of CON litter to a clean litter box and weigh the litter box; provide each pair of cats with CON litter box; weigh the cats; and then place the paired up cats in the same kennel.

(2) 24 hour—Remove and weigh CON litter box; add 3 lb aliquot of RP litter to a clean litter box and weigh the litter box; provide the same pair of cats with a RP litter box.

(3) 48 hour—Remove and weigh RP litter box; weigh the cats; and obtain the video records for subsequent analysis.

At the 24 and the 48 hour point of time, it was noted if any soiling had occurred outside of the litter box. Any social behavioral problems of the cats were also manually recorded, despite that video records provided a much more precise record of cat behaviors. Behaviors of each pair of cats were captured on video for the duration of the 48-hour period. Red lights were used at night to allow for continuous observation. Videos were later reviewed and analyzed in 5-minute scan samples to categorize each cat as anxious or relaxed based on behavioral definitions provided in Table 5. Further, it was also noted if aggression or litter box usage occurred between 5-minute periods. Video observers were blind to treatments to avoid bias.

Results as to Behaviors Having Significant Change Under RP Litter:

The average behavior scores for Day 1 (CON) and Day 2 (RP) were obtained as illustrated above, and are presented in Table 7. Among all the behaviors recorded and compared, aggression, litter box use and anxiety had the most significant change from Day 1 to Day 2 when the RP litter replaced the control litter (Table 7). These three behaviors were of the highest interest as they are the ones most characteristic and problematic among cats living in a group in one household.

TABLE 7

Average behavior scores on Day 1 (CON) and Day 2 (RP):

| Behavior | Day 1 Con | Day 1 SE | Day 2 RP | Day 2 SE |
|---|---|---|---|---|
| Head in food/H2O dish | 0.90 | 0.42 | 1.05 | 0.34 |
| Lying/sitting - not touching | 17.0 | 1.40 | 15.4 | 1.38 |
| Lying/sitting - touching | 0.89 | 0.65 | 0.98 | 0.73 |
| Aggression | 3.00 | 1.62 | 1.95 | 1.01 |
| In litter box - not using | 2.10 | 1.15 | 2.73 | 1.18 |
| In litter box - using | 0.07 | 0.06 | 0.27 | 0.12 |
| Grooming self | 0.70 | 0.25 | 0.77 | 0.27 |
| Grooming other | 0.03 | 0.07 | 0.01 | 0.02 |
| Sleeping | 1.98 | 0.87 | 2.71 | 0.91 |
| Neutral social interaction | 0.48 | 0.29 | 0.33 | 0.25 |
| Locomotion | 3.19 | 0.76 | 4.66 | 0.87 |
| Play | 0.65 | 0.32 | 0.52 | 0.23 |
| Anxiety (%) | 21.0 | 0.06 | 12.0 | 0.05 |

As shown in Table 7 above, anxiety of the cats in pairs decreased from 21% to 12%, a reduction of nearly 50% over the two days due to switching from untreated litter to litter treated with 2-methylbut-2-enal. The decreased anxiety was accompanied by decreasing aggression in Day 2. As shown, aggression decreased from 3.0 to 1.95, a 68.3% reduction from Day 1 to Day 2 after exposure to the RP litter.

The 24 pairs of cats were also ranked from most aggressive to least aggressive (Table 8) by the sum of the aggression scores of the two cats in Day 1.

TABLE 8

Aggression score ranking.
Average aggression scores by pair, ranked by most aggressive (1) to least aggressive (24). Total possible aggression score was 48 (2 hours with 2 cats X 24, 5-min periods)

| Pair # | Animal ID #s | Sex[1] | Day 1 (con) | Day 2 (RP) | Aggression Rank |
|---|---|---|---|---|---|
| 13 | 1784, 1770 | M, M | 27.00 | 18.25 | 1 |
| 10 | 1731, 1884 | F, F | 10.13 | 3.25 | 2 |
| 4 | 1915, 1853 | M, M | 6.50 | 0.08 | 3 |
| 3 | 1914, 1904 | M, M | 6.33 | 3.42 | 4 |
| 5 | 1907, 1912 | M, M | 3.58 | 4.67 | 5 |
| 1 | 1903, 1906 | M, M | 2.92 | 0.13 | 6 |
| 15 | 1828, 1816 | M, M | 2.54 | 3.83 | 7 |
| 14 | 1810, 1806 | M, M | 2.54 | 2.58 | 8 |
| 17 | 1680, 1780 | M, M | 2.46 | 2.13 | 9 |
| 18 | 1798, 1811 | M, M | 2.38 | 1.88 | 10 |
| 16 | 1681, 1772 | C, M | 1.63 | 0.71 | 11 |
| 11 | 1741, 1812 | F, F | 1.63 | 1.50 | 12 |
| 6 | 1852, 1886 | M, M | 1.08 | 0.13 | 13 |
| 8 | 1791, 1793 | F, F | 0.50 | 0.88 | 14 |
| 19 | 1899, 1897 | M, M | 0.33 | 0.00 | 15 |
| 22 | 1867, 1900 | F, F | 0.17 | 0.13 | 16 |
| 23 | 1911, 1901 | F, F | 0.08 | 1.00 | 17 |
| 21 | 1858, 1881 | F, F | 0.08 | 0.92 | 18 |
| 9 | 1782, 1776 | F, F | 0.08 | 0.08 | 19 |
| 7 | 1799, 1800 | F, F | 0.04 | 0.33 | 20 |
| 24 | 1862, 1863 | F, F | 0.00 | 0.63 | 21 |
| 20 | 1865, 1883 | F, F | 0.00 | 0.21 | 22 |
| 12 | 1815, 1773 | F, F | 0.00 | 0.00 | 23 |
| 2 | 18821, 856 | M, M | 0.00 | 0.00 | 24 |

M = Intact Male,
C = Castrated Male,
F = Intact Female

The litter box use increased from 0.07 to 0.27, a surprising 386% increase. The litter box usage increase observed in the video agreed with physical weight change of litter boxes, which increased by 438% (Table 9).

TABLE 9

Changes in litter box weights

| CON before | CON after | Change | RP before | RP after | Change | % difference |
|---|---|---|---|---|---|---|
| 2.11 | 2.14 | 0.02 | 2.1 | 2.21 | 0.11 | 438% |

Mixing beads containing 2-methylbut-2-enal into litter resulted in less aggression, lower anxiety and more litter box use in cats. This study showed that cats' behavior could be altered in response to the presence of 2-methylbut-2-enal in the litter. Accordingly, adding beads comprising 2-methylbut-2-enal to cat litter is potentially desirable for multi-cat households where aggression, anxiety, and inappropriate soiling are common problems.

Study 3

The most aggressive eight pairs of intact male cats from study 2 (Table, the pairs ranked 1 and 2-9) were selected for this 24-hour study, which was designed to assess if and how 2-methylbut-2-enal containing cat litter affects the multiple cats placed in one single room.

Between studies 2 and 3, cat pairs had been separated for at least 12 weeks. Control (CON) litter and rabbit pheromone (RP) litter were similarly prepared as illustrated in Study 2. Each pair of cats was placed in a kennel containing one food dish, one water dish, and one litter box. Food and water was available ad libitum during the study. Each kennel had a concrete floor and measured 1.1 m×1.5 m. Side fences were chain linked. A total of 4 kennels were placed in one single room, and two rooms were utilized for eight pairs of cats. Cat behaviors were captured on video for the duration of the 24-hour period. Red lights were used at night to allow for continuous observation. The study schedule was as follows:

(1) 0 hour—Add 3 lb. aliquot of CON litter to a clean litter box and weigh the litter box; place a CON litter box in each of the 4 kennels in Room One. Before placing a designated cat pair in each of the kennels, weigh the cats. Start the video taping.
(2) 0 hour—Add 3 lb. aliquot of RP litter to a clean litter box and weigh; place RP litter boxes in 4 kennels in a separate Room Two; weigh cats; place designated pairs in kennels; and start the video taping.
(3) 24-hour—Remove and weigh all litter boxes; weigh all cats. Video records were obtained and reviewed for summary and analyses.

At the 24-hour point of time, it was noted if any soiling had occurred outside of the litter box. Any social behavioral problems of the cats were also manually recorded, despite that video records provided a much more precise record of cat behaviors. Cat behavior of each pair was captured on video for the duration of the 24-hour period. Red lights were used at night to allow for continuous observation. Videos were reviewed and analyzed in 5 minute scan samples to categorize each cat as anxious or relaxed based on behavioral definitions in Table 5. Further, it was also noted if aggression or litter box usage occurred between 5-minute periods. Video observers were blind to treatments to avoid bias.

Results as to Treatment by Time Effects on Cat Behaviors:

The average behavior scores for this study were obtained as illustrated above, and are presented in Table 10. None of the behaviors evaluated over the full 24 hours were significantly changed by overall RP treatment (all P-values>0.01 in Table 10). In addition, the litter box usage was quite variable. It was noted that all four control litter cat pairs spilled litter and three out of four RP cat pairs spilled litter from their litter boxes, making it difficult to accurately account for the amount of litter box use during this 24-hour period. CON cats added 0.15 kg to their litter box while RP cats added 0.07 kg/day to their litter box (SE=0.02 kg). This change was not significant.

TABLE 10

Behavior scores (divided by 24 for % of observation) for control and RP litter

| Behavior | CON | CON SE | RP | RP SE | TRT P-Value |
|---|---|---|---|---|---|
| Head in food/H2O dish | 0.85 | 0.61 | 0.57 | 0.42 | 0.16 |
| Lying/sitting - not touching | 14.98 | 2.45 | 15.53 | 3.08 | 0.79 |
| Lying/sitting - touching | 0.73 | 1.11 | 0.64 | 0.79 | 0.92 |
| Aggression | 3.55 | 2.85 | 2.01 | 1.30 | 0.37 |
| In litter box - not using | 1.63 | 1.89 | 2.34 | 2.47 | 0.74 |
| In litter box - using | 0.31 | 0.28 | 0.20 | 0.22 | 0.23 |
| Grooming self | 0.56 | 0.44 | 0.52 | 0.47 | 0.90 |
| Grooming other | 0.03 | 0.12 | 0.00 | 0.00 | 0.36 |
| Sleeping | 0.95 | 1.41 | 0.63 | 1.32 | 0.59 |
| Neutral social interaction | 0.10 | 0.16 | 0.14 | 0.23 | 0.82 |
| Locomotion | 5.50 | 1.76 | 4.34 | 2.33 | 0.52 |

TABLE 10-continued

Behavior scores (divided by 24 for % of observation) for control and RP litter

| Behavior | CON | CON SE | RP | RP SE | TRT P-Value |
|---|---|---|---|---|---|
| Play | 0.84 | 0.68 | 0.92 | 0.87 | 0.89 |
| Anxiety (%) | 17.00 | 0.11 | 25.00 | 0.16 | 0.56 |

It was also observed that cat behaviors were quite variable over time, and it was believed that the small sample size was part of the reason. The Time by Treatment interaction was significant, however, for several behaviors observed, which behaviors included lying/sitting-touching, aggression, in litter box—using, neutral social interaction, and anxiety ($P<0.01$). These interactions are shown in FIGS. 2A-E. The greatest difference between control litter and RP litter treatment was observed in the first 6 hours after the cats were paired and exposed to litter.

Figure 2A:
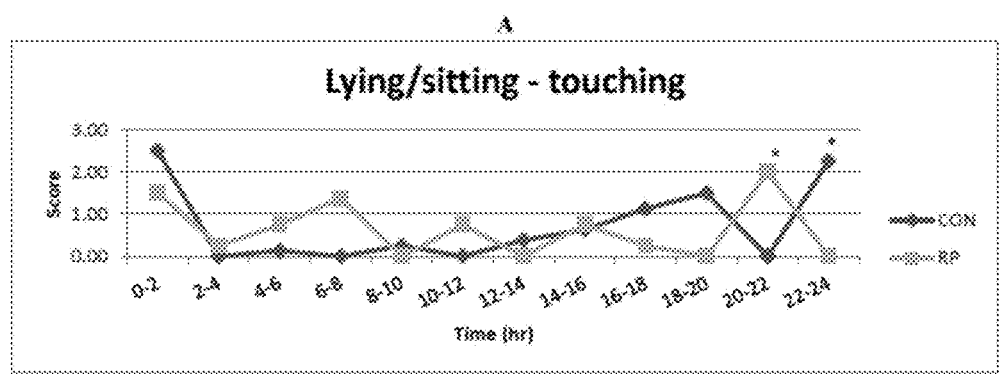
FIG. 2A is a graphic representation of the time by treatment interactions over a 24 hour period for lying/sitting—touching behavior displayed by cats exposed to the 2-methylbut-2-enal treated litter compared to the control litter; "*" Indicates a significant difference in means ($P<0.05$) (same below).

FIG. 2A shows the time by treatment interactions over a 24-hour period for lying/sitting—touching. Cats experiencing RP litter showed a tendency to sit or lie in contact during the 6-8 hour period ($P=0.07$; FIG. 2A), i.e., the cat is sitting or lying with some part of its body in direct contact of other individual. This behavior indicated that the cat was relaxed, socially friendly, having no anxiety, and was not aggressive at all. Also, sitting or lying in contact was significantly higher for cats experiencing RP litter during the 20-22 hour period ($P=0.01$). On the other hand, cats experiencing RP litter tended to sit or lie in contact less than cats experiencing CON litter during the 16-18 hour period ($P=0.05$), and the 22-24 hr period ($P=0.04$).

Figure 2B:
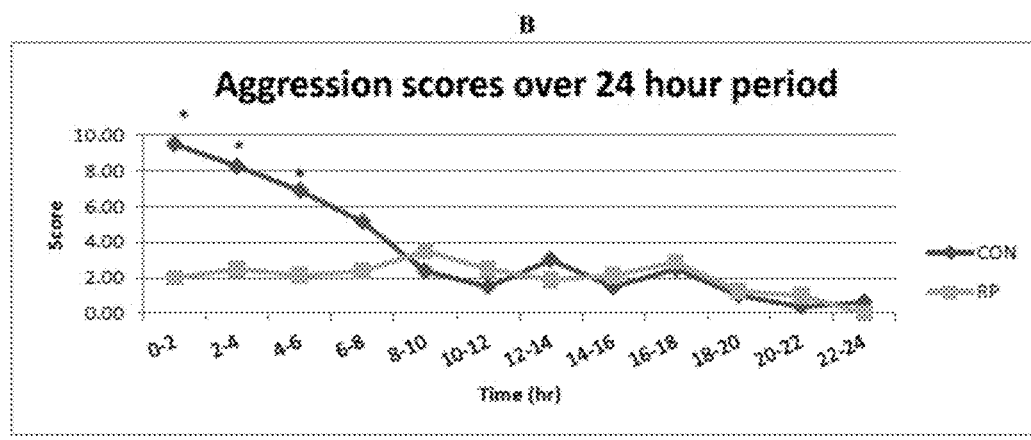
FIG. 2B is a graphic representation of the time by treatment interactions over a 24 hour period for aggression displayed by cats exposed to the 2-methylbut-2-enal treated litter compared to the control litter.

FIG. 2B shows the time by treatment interactions over a 24-hour period for aggression. During the first 6 hours, cats experiencing CON litter showed significantly greater aggression than cats experiencing RP litter ($P<0.01$; FIG. 1b). A cat behaving aggressively is actively engaged in fighting, hissing, or dominant behavior. In contrast, the initial period of intense aggression when the cats met was blunted when RP litter was present among the cats. This observation is significant for the intended use of RP containing litter in multi-cat households for controlling inter-cat aggression. The data showed that the cats responded to rabbit pheromone almost immediately upon exposure. This data also indicate that when the concentration of RP in the litter is around 0.0004% to 0.0006% (w/w), the aggression control was effective and the control lasted at least for about 6-8 hours. As discussed below, this initial 6-8 hours are important not only because cats tend to be the most aggressive during that period of time when introduced, but also their behavior in the initial hours impact their interaction in later time. Therefore, if cats' aggressive behaviors are under control when they first encounter, they tend to be less aggressive towards each other in the future. The data here indicate that RP litter controls cat aggression effectively by reducing aggression behavior at least in the first 6-8 hours. In addition, it is conceivable that the RP composition can be formulated accordingly either by increasing the concentration or by adding the same amount of RP to the litter multiple times a day to prolong the effective period of aggression control.

Figure 2C:
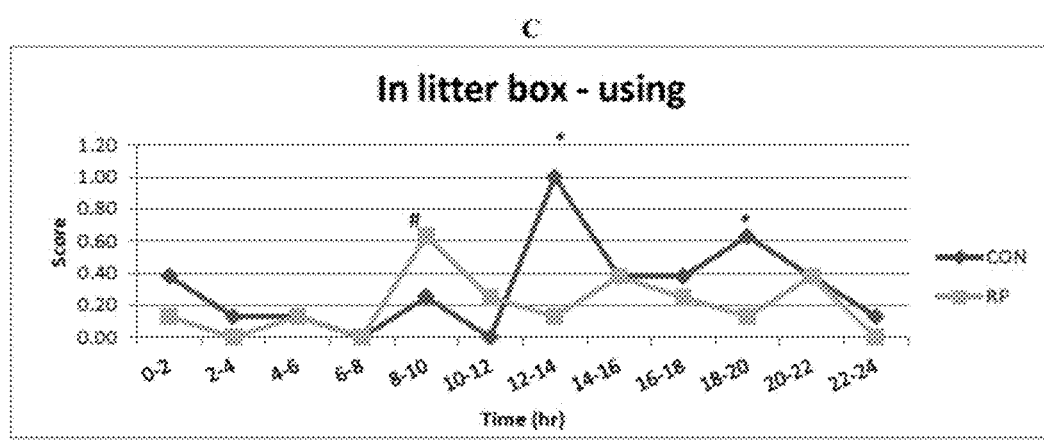
FIG. 2C is a graphic representation of the time by treatment interactions over a 24 hour period for litter box use behavior displayed by cats exposed to the 2-methylbut-2-enal treated litter compared to the control litter.

FIG. 2C shows the time by treatment interactions over a 24-hour period for litter box use. Cats experiencing RP litter tended to use the litter box more often during the 8-10 hour period than did cats experiencing CON litter ($P=0.10$), indicating that the litter dominant behaviors in the cats were reduced and the cats tended to share the litter more, which is desirable in multi-cat households. Cats experiencing CON litter used the litter box significantly more during the 12-14 hour period and the 18-20 hour period ($P<0.01$ and $P=0.03$, respectively), which may be associated with elevated anxiety in later hours (FIG. 2E). Increased litter sharing is therefore a later responding behavior of cats under RP exposure (8-10 hour period), which follows a significantly reduced aggression in the initial 0-8 hour period.

Figure 2D:
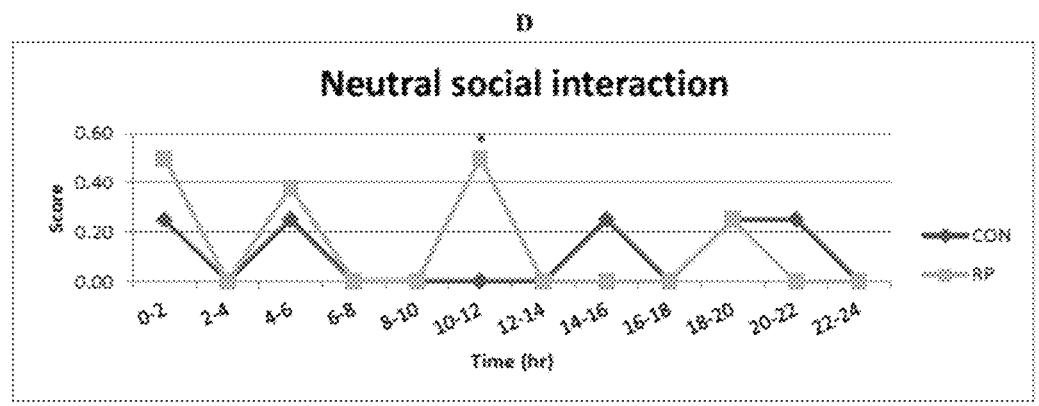
FIG. 2D is a graphic representation of the time by treatment interactions over a 24 hour period for neutral social interaction displayed by cats exposed to the 2-methylbut-2-enal treated litter compared to the control litter.
Figure 2E:
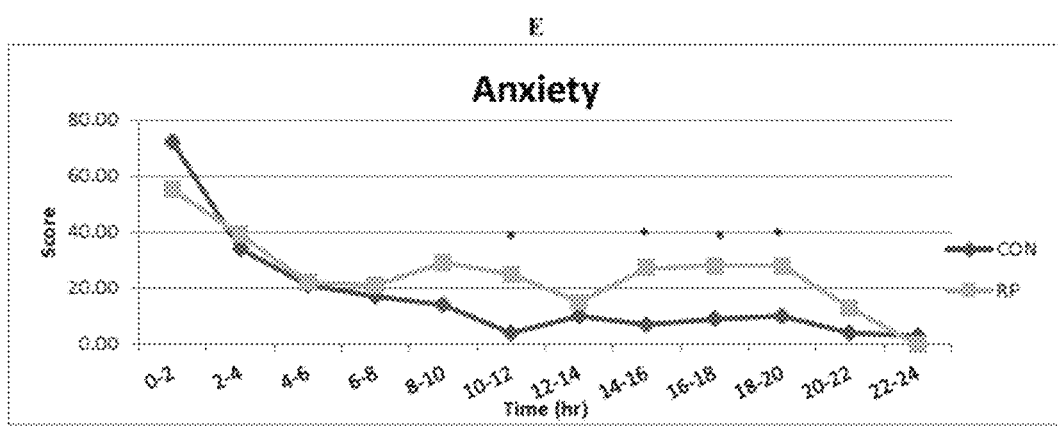
FIG. 2E is a graphic representation of showed the time by treatment interactions over a 24 hour period for anxiety displayed by cats exposed to the 2-methylbut-2-enal treated litter compared to the control litter.

FIG. 2D shows the time by treatment interactions over a 24-hour period for neutral social interaction. Neutral social interactions are non-aggressive social interactions, such that the cat is engaged in non-aggressive interaction with another individual, such as nose-touching or rubbing. This is also desirable among cats living in one household. Cats experiencing RP litter had significantly more neutral (non-aggressive) social interactions than cats experiencing CON litter during the 10-12 hour period ($P<0.01$). Neutral social interaction is therefore also a later responding behavior of cats under RP exposure, which follows a significantly reduced aggression in the initial 0-8 hour period.

FIG. 2E shows the time by treatment interactions over a 24-hour period for anxiety. In the first 2 hour period, cats experiencing RP litter were significantly less anxious than those experiencing CON litter ($P=0.04$). In the same time period, the cats were also significantly less aggressive. However, during the 8-10 hour period, cats experiencing RP litter showed a tendency to be more anxious than cats experiencing CON litter ($P=0.06$). The anxiety extended further to the 10-12 hour period and 14-20 hour period, during which cats experiencing RP litter were significantly more anxious ($P<0.01$ for 10-12 hour, $P=0.01$ for 14-16 hour, $P=0.03$ for 16-18 hour, and $P=0.03$ for 18-20 hour). Anxiety-like behaviors in these later hours were believed to be the method cat pairs used to establish social bonds without the use of overt aggression. Therefore, this is also a desirable attribute of RP litter for cats that have the tendency to be aggressive and anxious.

Figure 3A:
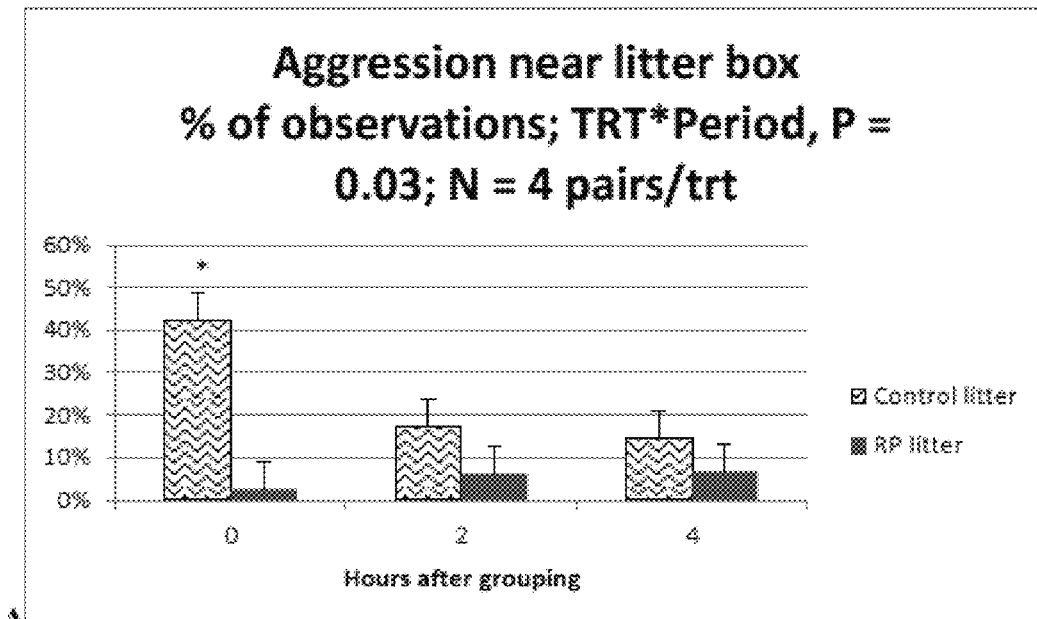
FIG. 3A is a graphic representation of the aggression pattern near litter box during the first 6 hours (0-2, 2-4, 4-6 hours) after grouping of cats following exposure to control litter and litter treated with 2-methylbut-2-enal. "*" Indicates a significant difference in means ($P<0.05$).
Figure 3B:
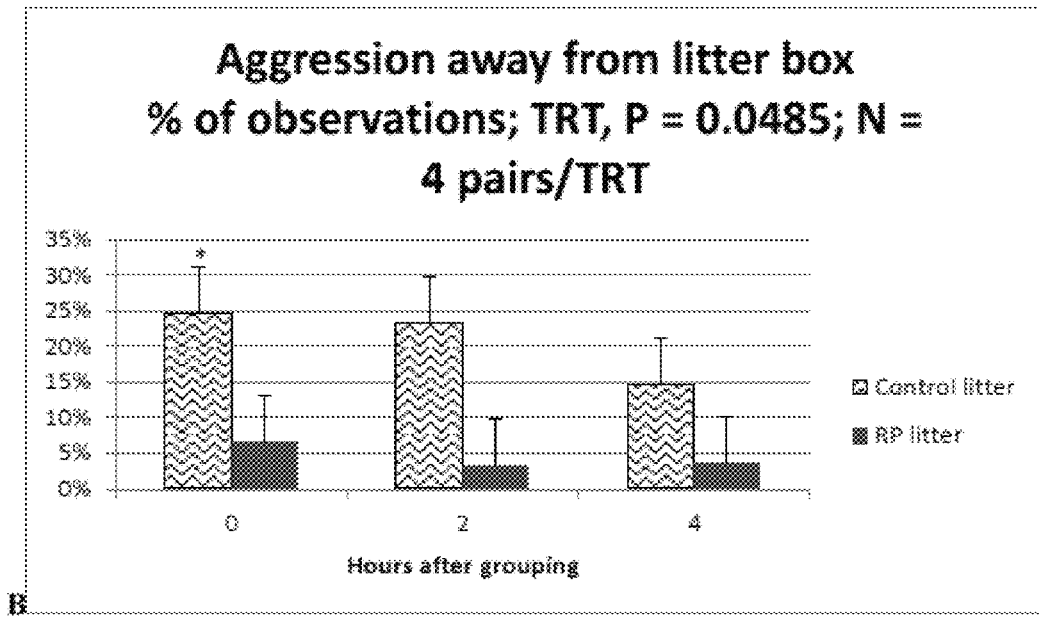
FIG. 3B is a graphic representation of the aggression pattern away from litter box during the first 6 hours (0-2, 2-4, 4-6 hours) after grouping of cats following exposure to control litter and litter treated with 2-methylbut-2-enal. "*" Indicates a significant difference in means ($P<0.05$).

Result as to Aggression Pattern in Relation to the Distance from the RP Litter:

Aggression patterns during the first 6 hours when multiple cats were placed together were significantly lower among cats given the RP litter. The videos for that period were re-reviewed to analyze the place where the aggression took place in relation to the location of the litter. Aggression was noted as either "near", defined as in the litter box or within 1 body length from the side of the litter box, or "away from", defined as from the side of the litter box greater than 1 body length. The aggressive behavior pattern during the first 6 hours near or away from the litter box are shown in FIGS. 3A and 3B, respectively. As shown in FIG. 3A, during 0-2 hour period, aggressive behavior in cats experiencing CON litter is more than 40% of the observations, significantly higher than 2-3% among the cats experiencing RP litter aggression ($P<0.01$). Such a significant difference was also seen when the cats were away from the litter box in the 0-2 hour period ($P<0.01$), as the aggression among cats with CON litter is 25% versus 5-6% among cats with RP litter. The significantly lower aggression away from the RP litter box was also observed during the 2-4 hour period ($P<0.01$), evidenced by 23-24% aggression among cats with CON litter versus 4% among cats with RP litter. This indicates that the effect of RP litter to the multiple cats in one room is not correlated to the distance between the cats and the litter.

Levin et al., (2005) conducted a survey regarding inter-cat aggression after introducing a new cat to the household. It found that the majority of inter-cat aggression appears to occur within the first 6 hours after new cats are introduced. It also found that fighting upon initial introduction was strongly associated with future fighting. By reducing the aggression during initial introduction, future inter-cat aggression in the household may be reduced or eliminated. The RP litter of this invention decreased aggression among multiple cats significantly during this important period of time. The presence of RP in the litter reduced cat aggression during initial introduction and this was not simply a delay of aggression to later hours; when they seemed to resolve social issues with less aggression and engage in interaction by touching or sharing litter.

Cat litter comprising about 0.0004% to about 0.0006% (w/w) RP is effective in controlling anxiety and aggression in cats, not only for the initial 6-8 hours upon exposure, but also establishing social bonds without using overt aggression in later hours. RP litter has significant, rapid and long-lasting control of aggressive behavior in multiple cats placed together in a room, independent of the distance between the cat and the litter. Therefore, the present invention relating to an animal litter composition comprising 2-methylbut-2-enal containing is effective in controlling behaviors of cats that have a tendency to be aggressive or anxious due to stresses from various sources.

One skilled in the art would readily appreciate that the methods, compositions, and products described herein are representative of exemplary embodiments, and not intended as limitations on the scope of the invention. It will be readily apparent to one skilled in the art that varying substitutions and modifications may be made to the present disclosure disclosed herein without departing from the scope and spirit of the invention.

All patents and publications mentioned in the specification are indicative of the levels of those skilled in the art to which the present disclosure pertains. All patents and publications are herein incorporated by reference to the same extent as if each individual publication was specifically and individually indicated as incorporated by reference.

The present disclosure illustratively described herein suitably may be practiced in the absence of any element or elements, limitation or limitations that are not specifically disclosed herein. Thus, for example, in each instance herein any of the terms "comprising," "consisting essentially of," and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for reducing dominant behavior in multiple household animals for a period of time using a single animal litter composition, the method comprising:
incorporating a pheromone composition comprising 2-methylbut-2-enal into an animal litter material to form the animal litter composition;
wherein the incorporating the pheromone composition into the animal litter material comprises mixing molded particles comprising the pheromone composition into the animal litter material.

2. The method of claim 1, wherein the pheromone composition comprises from between about 0.001% (w/w) to about 1% (w/w) 2-methylbut-2-enal.

3. The method of claim 1, wherein the animal litter composition comprises from between about 0.0001% (w/w) to about 0.1% (w/w) 2-methylbut-2-enal.

4. The method of claim 1, wherein the molded particles are selected from pellets, spheres, microspheres, beads, microbeads, bubbles, microbubbles, flakes or granules.

5. The method of claim 4 wherein the molded particles are bead shaped.

6. The method of claim 1, wherein the molded particles are between about 0.02" and about 0.1" in diameter.

7. The method of claim 1, wherein the animal litter composition comprises from between about 0.01% (w/w) to about 15% (w/w) molded particles.

8. The method of claim 7, wherein the animal litter composition comprises about 2% (w/w) molded particles.

9. The method of claim 1, wherein the molded particles comprise from between about 0.001% (w/w) to about 1% (w/w) 2-methylbut-2-enal.

10. The method of claim 9, wherein the molded particles comprise from between about 0.01% (w/w) to about 0.05% (w/w) 2-methylbut-2-enal.

11. The method of claim 10, wherein the molded particles comprise from between about 0.01% (w/w) to about 0.03% (w/w) 2-methylbut-2-enal.

12. The method of claim 1, wherein the animal litter material is selected from the group consisting of clay, organic material, polymers, silica gel, and combinations thereof.

13. The method of claim 1, wherein the pheromone composition further comprises at least one organic solvent.

14. The method of claim 1, wherein the pheromone composition further comprises an additional component selected from the group consisting of a surfactant, a thickener, a fragrance, an odor remover and combinations thereof.

15. The method of claim 1, wherein the pheromone composition comprises at least one additional pheromone.

16. A method of using a single animal litter composition to reduce dominant behaviors in multiple household animals for a period of time, the method comprising: incorporating a pheromone composition comprising 2-methylbut-2-enal into an animal litter material to form an animal litter composition; and exposing the household animals to the animal litter composition, the amount of 2-methylbut-2-enal being present in the animal litter composition in an amount of from between about 0.0001% (w/w) to about 0.1% (w/w); wherein the incorporating the pheromone composition into the animal litter material comprises mixing molded particles comprising the pheromone composition into the animal litter material.

17. A method of making an animal litter composition, wherein the method comprises: preparing a pheromone composition comprising 2-methylbut-2-enal;
incorporating a pheromone composition into animal litter material to form the animal litter composition, wherein the pheromone composition comprises from between about 0.0004% (w/w) to about 1% (w/w) 2-methylbut-2-enal, and the litter composition comprises from between about 0.00001% (w/w) to about 0.1% (w/w) 2-methylbut-2-enal; wherein the incorporating the pheromone composition into the animal litter material comprises mixing molded particles comprising the pheromone composition into the animal litter material.

18. A method of making an animal litter composition, wherein the method comprises:
   a) preparing a polymeric formulation comprising an amount of 2-methylbut-2-enal, an amount of a polymer, and optionally an amount of additives;
   b) extruding the polymeric formulation to form molded particles; and
   c) mixing the molded particles into an animal litter material, wherein the litter composition comprises from between about 0.01% (w/w) to about 15% (w/w) molded particles.

19. A method of making an animal litter composition, wherein the method comprises:
   a) preparing a polymeric formulation comprising an amount of 2-methylbut-2-enal, an amount of a polymer, and optionally an amount of additives;
   b) extruding the polymeric formulation to form a polymeric matrix;
   c) forming the polymeric matrix into molded particles; and
   d) mixing the molded particles into an animal litter material, wherein the litter composition comprises from between about 0.01% (w/w) to about 15% (w/w) molded particles.

20. The method of claim 19, wherein the polymeric formulation comprises from between about 0.001% (w/w) to about 1% (w/w) 2-methylbut-2-enal and from between about 50% (w/w) to about 99.99% (w/w) of a polymer, and optionally from between about 0.0001% (w/w) to and about 5% (w/w) of additives.

21. The method of claim 19, wherein the polymer is selected from the group consisting of polyethylene, polyvinyl acetate, ethylene acid copolymers, ethylene acrylates, polyurethanes, styrene-butadiene, polyvinyl butyral, polyvinyl chloride (PVC), polyolefin, polyacrylate, polymethacrylate esters, silicon polymer, and combinations thereof.

22. The method of claim 19, wherein the additives are selected from the group consisting of plasticizers, stabilizers, fragrances, deodorants, coloring agents, synergists, lubricants, fillers, preservatives, antioxidants, light stabilizers, and combinations thereof.

23. The method of claim 19, wherein the molded particles are selected from pellets, spheres, microspheres, beads, microbeads, bubbles, microbubbles, flakes or granules.

* * * * *